United States Patent [19]

Rollett

[11] Patent Number: 5,065,431
[45] Date of Patent: Nov. 12, 1991

[54] PATTERN RECOGNITION USING STORED N-TUPLE OCCURENCE FREQUENCIES

[75] Inventor: John M. Rollett, Ipswich, England

[73] Assignee: British Telecommunications public limited company, United Kingdom

[21] Appl. No.: 319,080

[22] PCT Filed: Jul. 7, 1988

[86] PCT No.: PCT/GB88/00538

§ 371 Date: Feb. 21, 1989

§ 102(e) Date: Feb. 21, 1989

[87] PCT Pub. No.: WO89/00747

PCT Pub. Date: Jan. 26, 1989

[30] Foreign Application Priority Data

Jul. 9, 1987 [GB] United Kingdom ............... 8716194

[51] Int. Cl.$^5$ ............................ G10L 7/08; G10L 7/02
[52] U.S. Cl. ......................................... 381/43; 381/41
[58] Field of Search .................................. 381/41–46; 364/513.5, 513; 382/10, 14–15, 16, 30

[56] References Cited

U.S. PATENT DOCUMENTS

| | | | |
|---|---|---|---|
| 3,521,235 | 7/1970 | Becker | 340/146.3 |
| 4,087,630 | 5/1978 | Browning et al. | 179/150 |
| 4,319,085 | 3/1982 | Welch et al. | 179/150 |
| 4,490,847 | 12/1984 | Aleksander | 382/10 |
| 4,513,436 | 4/1985 | Nose et al. | 381/43 |
| 4,760,604 | 7/1988 | Cooper et al. | 382/15 |
| 4,782,459 | 11/1988 | Johnston | 364/724.19 |
| 4,805,225 | 2/1989 | Clark | 382/15 |

FOREIGN PATENT DOCUMENTS 0181167 5/1986 European Pat. Off. .

OTHER PUBLICATIONS

IEEE Transactions on Audio and Electroacoustics, vol. AU-16, No. 2, Jun. 1968, pp. 235–239, IEEE, New York, U.S.; R. F. Purton: "Speech Recognition Using Autocorrelation Analysis".

Steck—"Stochastic Model for the Browing-Bledsoe Pattern Recognition System"—IRE Transactions on Electronic Computers, Apr. 1962, pp. 274–282.

Hughes—"On the Mean Accuracy of Statistical Pattern Recognisors", IEEE Transaction on Information Theory, vol. IT-14, No. 1, Jan. 1968, pp. 55–63.

Ullmann—"Experiments with the N-Tuple Method of Pattern Recognition", IEEE Trans. 1969, C-18, pp. 1135–1137.

Ullmann, Butterworths—"Pattern Recognition Techniques", pp. 112–121.

Aleksander & Stonham—"Guide to Pattern Recognition Using Random Access Memories"—Computers and Digital Techniques, Feb. 1979, vol. 2, No. 1, pp. 29–40.

"Seeking the Mind in Pathways of the Machine"—The Economist, 27 Jun., 1985, pp. 83–88.

Fairhurst & Aleksander—"Dynamics of the Perception of Patterns in Random Learning Nets", MPPP-21, pp. 311–316, date unknown.

Tattersall et al.—"Speech Recognizers Based on N-Tuple Sampling", Proceedings of the Institute of Acoustics, Autumn conference 1984, vol. 6, Part 4, pp. 405–413.

Bledsoe et al., "Pattern Recognition and Reading by Machine"—1959 Proceedings of the Eastern Joint Computer Conference—pp. 225–232.

Primary Examiner—Dale M. Shaw
Assistant Examiner—John Merecki
Attorney, Agent, or Firm—Nixon & Vanderhye

[57] ABSTRACT

A pattern recognizer uses the method of n-tuples applied to a matrix containing (e.g.) features derived from input speech. A template store records during a training sequence the frequencies of occurrence of combinations of bits with each n-tuple group. During recognition frequencies associated with combinations which occur are used to form a measure of similarity.

46 Claims, 4 Drawing Sheets

| | VALUE | FREQUENCY |
|---|---|---|
| INDEX 737 | ⋮ | ⋮ |
| | | |
| | 201 | 4 |
| | 137 | 1 |
| INDEX 738 | | 0 |
| | | 0 |
| | | 0 |
| | | |
| INDEX 739 | ⋮ | ⋮ |

| | VALUE | FREQUENCY | |
|---|---|---|---|
| 15 | | | |
| 16 | | | |
| ENTRY 1 | 139 | 3 | |
| 2 | 28 | 1 | |
| | 67 | 1 | |
| | | 0 | |
| | | 0 | |
| | | 0 | |
| | | 0 | |
| | | 0 | |
| 8 | | 0 | |
| 9 | | 0 | |
| | | 0 | |
| | | 0 | |
| | | 0 | |
| | | 0 | |
| | | 0 | |
| | | 0 | |
| 16 | | 0 | |
| 1 | | | |
| 2 | | | |

MICROFEATURE 311
MICROFEATURE 312
MICROFEATURE 313

Fig. 5b

| 139 | 19 |
|---|---|
| 67 | 12 |
| 28 | 7 |
| 42 | 6 |
| 7 | 5 |
| 89 | 4 |
| 238 | 3 |
| 17 | 3 |
| 99 | 2 |
| 16 | 1 |
| 33 | 1 |
| | 0 |
| | 0 |
| | 0 |
| | 0 |
| | 0 |

PATTERN RECOGNITION USING STORED N-TUPLE OCCURENCE FREQUENCIES

BACKGROUND OF THE INVENTION

1. Field of the Invention

The present invention relates to pattern recognition, and particularly, though not exclusively, to speech recognition.

2. Description of the Related Art

The n-tuple method of pattern recognition, which was originally suggested by Bledsoe & Brown ("Pattern recognition and reading by machine", Proc. Eastern Joint Computer Conf., Boston, pp 225-232; 1959), has been proposed for the recognition of two-dimensional patterns. FIG. 1 shows an $N \times M$ pattern each element of which is represented by a single bit, either a "0" or a "1". Sets of n bits are selected in a specified way (e.g. at random) from the array forming in each case an 'n-tuple'. Usually each bit is used once so that there are $NM/n$ n-tuples. A template store (FIG. 2, which assumes $n=4$) has $NM/n$ rows (one for each n-tuple) and $2^n$ columns. In a training sequence each n-tuple is interpreted as a binary number from 0 to $2^n - 1$ and a 1 is written into the corresponding column of the row assigned to that n-tuple. A number of training passes on patterns, all of course with the *same* n-tuple selection, will plot further 1's into the template store—which may or may not coincide with those already written in, according to the degree of similarity between the patterns.

Templates are formed in this way for a number of patterns to be recognised. When an unknown pattern is to be identified, n-tuples are formed in the same way and each is used to read out the corresponding location in one of the template stores. The number of '1's found represents a 'score' of the similarity between the unknown and the known pattern. Scores are obtained for each template and the unknown pattern is deemed to be recognised as being that corresponding to the template giving the highest score.

Tattersall and Johnston ("Speech Recognisers based on N-tuple Sampling", Proceedings of the Institute of Acoustics, Vol 6 part 4 pp 405-413, Autumn Conference, 1984) have proposed a speech recogniser using this principle. In this case, in the pattern of figure 1, the column represents successive samples in time of a word of speech, and the bits within each column represent a binary coding (e.g., a bar code) of that sample (or optionally of extracted features). This pattern is then analysed in much the same way as described above.

SUMMARY OF THE INVENTION

This invention stores n-tuple occurrence frequencies in a training mode and uses such stored frequency measurements in a recognition mode to form similarity measurements and further updates the stored frequency measurements during the recognition process in one exemplary embodiment.

The present invention is defined in the appended claims.

BRIEF DESCRIPTION OF THE DRAWINGS

Some embodiments of the invention will now be described, by way of example, with reference to the accompanying drawings in which:

FIGS. 5a and 5b illustrates a modified form of microfeature selection; and

The embodiment to be described is concerned with speech recognition; however, it is to be noted that the invention is also of value in recognising other types of patterns.

Figures 1, 2:
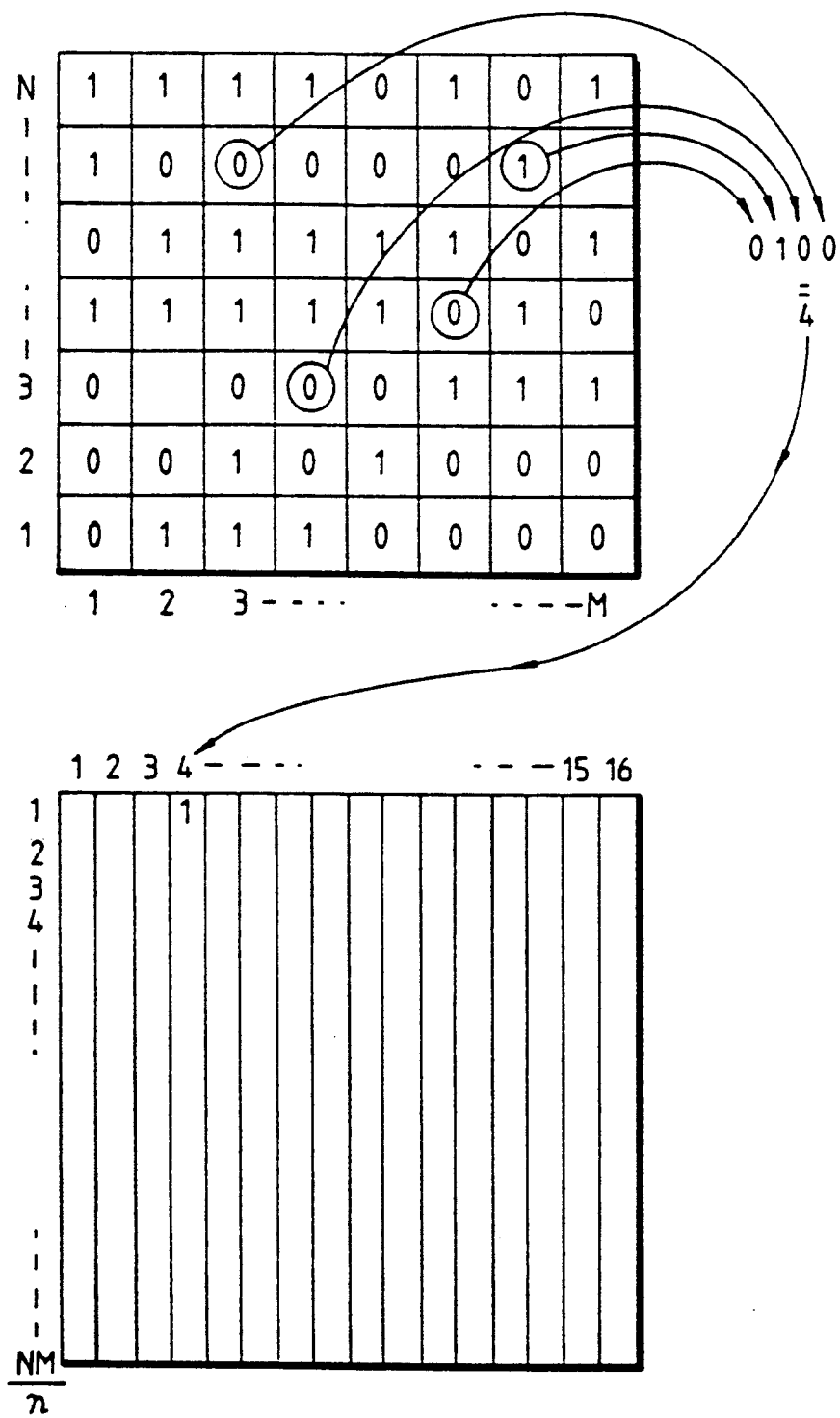
FIGS. 1 and 2 depict prior art pattern recognition processes.
Figure 3:
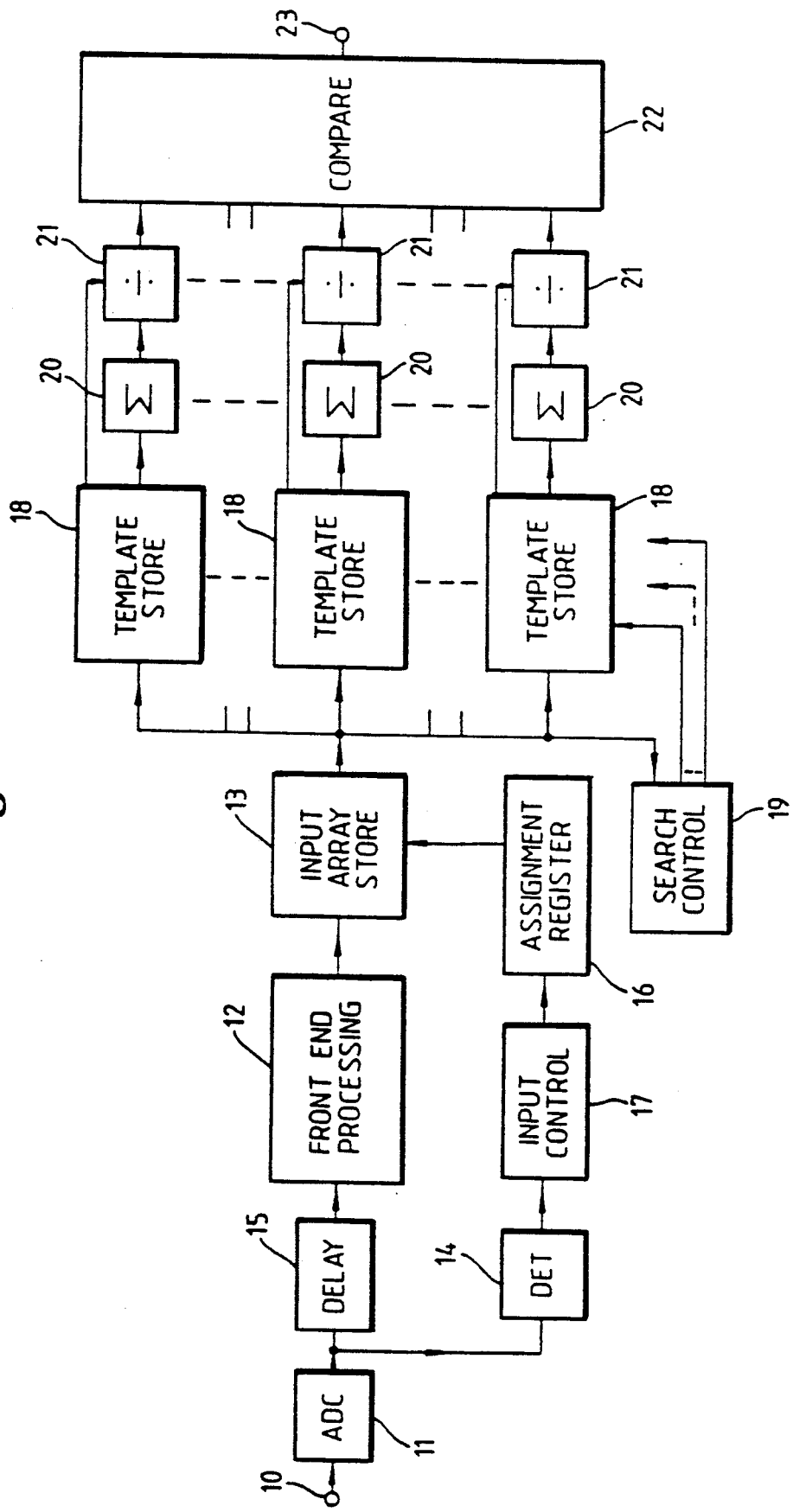
FIG. 3 is a block diagram of one form of speech recognition apparatus according to the invention.

The apparatus shown in FIG. 3 has an audio input 10 for receiving speech signals which are converted by an analogue to digital converter 11. Although the raw time domain samples could be directly utilised (as proposed by Tattersall and Johnston), in this embodiment they are supplied to a front end processing unit 12 which serves to convert them (as described in more detail below) into binary representations of various characteristics of the speech, e.g., energy profile, spectral values, zero-crossing rate. It is assumed that this output is of 80 bits and is provided for each 10 ms period of speech.

The front end processing unit 12 supplies data continuously, to an input array store 13, but the contents of the store are not acted upon until the commencement of a word is recognised by a detector 14 which monitors the input signal and triggers when for example a certain zero crossing count or energy threshold—or a combination of the two—occurs. A few periods of data—e.g., 30 ms—are also captured to ensure that low level sounds occurring before the trigger event occurs are included. A delay 15 may be included if the inherent delay of the front end processing unit 12 is not sufficient.

The input array store 13 accommodates 1 second of data (i.e. 100 10 ms periods) and therefore has a capacity of $80 \times 100 = 8000$ bits. However the detector 14 is arranged to inhibit the further processing of periods of silence in the event that the word input is shorter than 1 second duration. If desired, the duration of the word may be taken into account in weighting the final recognition process.

The 8000 bits are notionally divided into microfeatures each consisting of an ordered set of 8 bits ("8-tuples"). In principle these are selected at random from the input array store although as will be discussed further below certain constraints may be placed on the selection. In the case of FIG. 3 there are 1000 microfeatures. The addresses of those bits in the input array making up each microfeature are stored in an assignment register 16 which is a store having $1000 \times 8$ locations accessible by means of an index number (1 ... 1000) and bit number (1 ... 8) produced by an input control unit 17.

Note that it is not in principle necessary that all microfeatures consist of the same number of bits; however this will be assumed in the description which follows.

The apparatus operates in (a) a learning mode and (b) a recognition mode. In the learning mode, spoken words input in a training sequence are used to form templates in a number of template stores 18. Unlike the previous proposals discussed above which simply record the fact of occurrence of a given microfeature having a particular value, it is proposed here to record the frequency of its occurrence during the training sequence. Although in principle a similar store organisation might be used, but with several bits per location to accommodate a frequency rather than just a single bit, this represents a significant storage capacity (viz. 1000×256×e.g., 3 bits for the frequency=768Kbit) per store, and the preferred arrangement, which also serves to facilitate certain modifications, is as described below. Note however that this store arrangement is advantageous even in the case where the frequencies are not stored.

Figure 4:
FIG. 4 illustrates the operation of the template store of FIG. 3.
Figure 4:
Figure 4:

One template store 18 is depicted in FIG. 4 (the others being identical). It contains several (e.g., 5) entries for each microfeature (i.e., 5000 entries in all); each entry consists of one 8-bit byte for a microfeature value, and one byte for its frequency (i.e., 10,000 bytes).

The index number determines the address where the microfeatures are stored, and provided the number of locations reserved for values of each microfeature is fixed, then the location and index are functionally related, and each can readily be calculated from the other.

During the training sequence, a chosen word is repeated a certain number of times (e.g., 5). Successive microfeatures are generated by applying the index numbers (and bit numbers) in turn to the assignment register 16 to address the appropriate location in the input array store 13, and provide 1000 8-bit microfeature values. Each microfeature value obtained is stored as an entry in the template store with a frequency of one, unless it has previously occured for that microfeature in which case the frequency stored against that value is increased by one. Thus if, as shown for microfeature index no 738, value 201 has occurred four times and 137 once, there are two entries for that microfeature, the other three being zero.

In the recognition mode, microfeature values are obtained from the input array store in exactly the same way. Referring again to FIG. 3, a search unit 19 takes each value and searches in the template store for the group of entries corresponding to that microfeature to find a match; if a match is found, the corresponding frequency is read out and passed to an accumulator 20 which forms the sum of the frequencies thus read out. This result is then divided (divider 21) by the maximum possible total for that template, i.e. the sum of the maximum frequency for each of the 1000 microfeatures. This total could be calculated when required, or (as shown) may be stored in an additional location in the template store.

A template store 18, accumulator 20, and divider 21 are provided for each word to be recognised. A comparator 22 receives the scores output from each of the dividers 21 and produces at an output 23 a signal indicating which template has produced the highest score—i.e., which word has been recognised. The recognition process may be subject to the criterion that the highest score exceed a threshold before *any* output occurs.

The apparatus described relies for time alignment upon the action of the detector 14. It is possible however that variations in volume (for example) may result in inconsistent alignment of the training utterances. This means that the apparatus having been trained on several utterances with differing alignments 'learns' a degree of tolerance to misalignment. However, in a modified version of the apparatus, each word after the first is subjected to the *recognition* process against the template already found, both in the time alignment determined by the detector 14 and also with shifts of (for example) ±10 ms and ±20 ms. The alignment which gives the highest score is chosen and the template updated on that basis. This adjustment will reduce the above-mentioned tolerance of the recognition process to time alignment errors and therefore it follows that the same trial shifting of the unknown utterance must be carried out prior to recognition. The desirability of this modification will depend on the time delay acceptable for recognition where the template store is to be trained on different words; the alignment process would of course need to operate independently for the different words. A further preferred feature is the provision of adaption, whereby the templates continue to "learn" during the recognition mode. A simple method of achieving this would be to increment the frequency associated with a microfeature value which contributes to a successful recognition. Thus the "frequencies" would become the frequencies of recognitions known to be successful, rather than the frequencies of occurrence during the training session.

The increasing of the frequencies by one could be done automatically, whenever the recogniser operates, on the assumption that the word output is always correct, but preferably occurs in accordance with an external input so that the machine is told when it is right, or (alternatively) only if it is wrong. If the machine is used in a dialogue, then the dialogue might be configured so that confirmation is requested at various stages. When this happens in a way which indicates a successful recognition, the frequencies of the microfeature values which contributed to the score would be increased by one.

A more sophisticated technique would be to add to the template *all* the microfeatures from the successfully recognised word. This facility would require the provision of increased storage capacity for the template, and a strategy for preventing the stored frequencies becoming too large. The corollary of this is that the template can be allowed to "forget" microfeature values which no longer appear. This implies that the apparatus when used for example for speaker recognition or verification will be able to track changes in the speaker's voice over a period of time.

FIG. 5 shows a section of a modified template store; only the storage allocated for one microfeature (e.g., index no. 312) is shown, but each microfeature is allocated 16 entries of two (8-bit) bytes each. During the learning phase (e.g.) five utterances yield up to five values for microfeature 312, with frequencies totalling 5. Typical figures are shown in FIG. 5a, in descending order of frequency, in the first three entries. The remaining entries have a frequency of 0; the contents of the associated value fields are of course immaterial.

In the recognition mode, each time the template gives rise to a successful recognition, either:

(a) the microfeature has a value not already entered; this value is entered in the next available entry field with a frequency of one, (if—as described below for time warping—more than one value is obtained, the choice of which one to enter is arbitrary), or (b) the microfeature has a value already entered; the existing frequency is increased by one and (if necessary) the order of the entries is adjusted to maintain the descending order of frequency. In this way, the storage reserved for each microfeature will after a time consist of several microfeature values at the top of the list with frequencies greater than one, and the remainder will have frequencies of one. (FIG. 5b).

However it is suggested that only the first eight entries are used in the recognition process; the values in locations 9 to 16 being kept in waiting, and becoming effective only when the re-ordering process brings them up into the top 8 locations. To avoid values in the top 8 locations varying too rapidly, a notional barrier may be drawn between locations 8 and 9; a value in location 9 can only move up across this barrier if its frequency is more than twice the frequency of the value in location 8.

Two possible overflow conditions may occur. Firstly, the upper entries may become too large—in which case all the frequencies are halved, being rounded down so that frequencies of one become zero, i.e. leaving empty entries for new values to occupy. To prevent the lower locations being filled by ineffective values, this may be done at a much lower frequency (e.g., 31) than that dictated by the store size. The likelihood of the second possibility—that of all entries being occupied—will thereby be much reduced but if it occurs it is suggested that an existing entry in entry 16 is always jettisoned in favour of a new one.

It should be noted that after halving the "frequencies" of existing microfeature values, and creating vacancies, any new microfeature value will acquire a greater frequency relative to these than its true frequency of occurrence would suggest. This gives it a greater chance of surviving and rising towards the top of the list, a characteristic which appears to be desirable. In this way, the constitution of the template is continually adapted according to the success the apparatus achieves in recognition. In speaker verification applications, it would clearly be important to adapt the template only when there was 100% certainty that the correct speaker had been identified. Conversely, the confidence that this was so should increase continually the more the apparatus was used.

Figure 6:
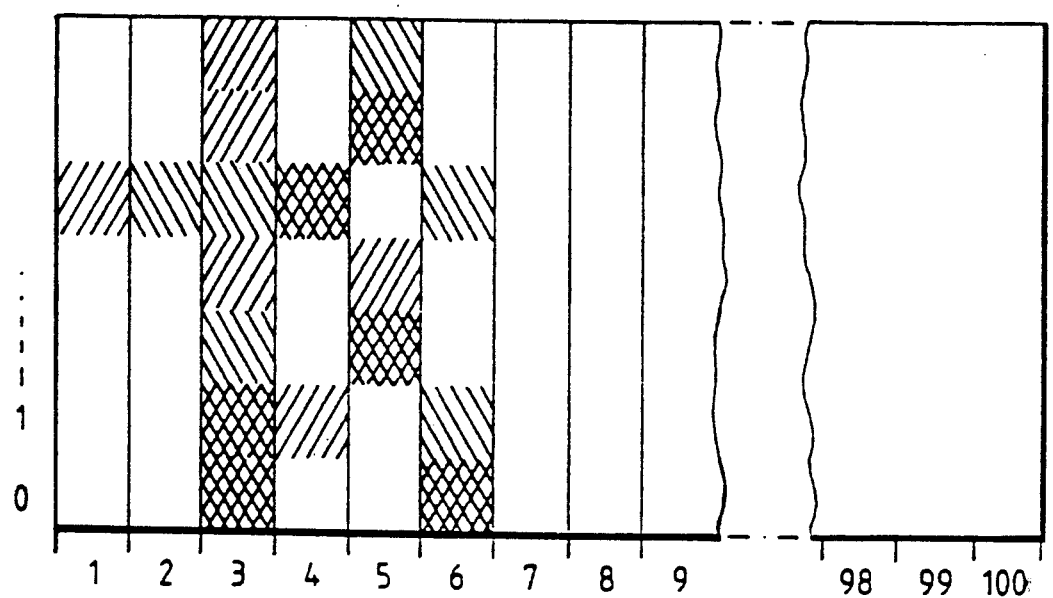
FIG. 6 illustrates a modified version of the template store of FIG. 4.

It has already been mentioned that the selection of microfeatures may not be entirely random. In a modification it is proposed that the ordered set of bits making up a microfeature be randomly selected subject to the constraint that the bits making up any given set all lie within a time window of set width. For example using the figures given above where the input array store has 100 columns each representing 10 ms the 8 bits forming each microfeature may lie within a 50 ms window. For example microfeature 1 shown in FIG. 6 lies within 10 ms periods 1 to 5 whilst microfeature 2 lies within 10 ms periods 2 to 6 and 3 within periods 3 to 7. The 50 ms windows may be arbitrary, or each microfeature may lie within a respective different 50 ms window (subject to adjustment at the ends of the store). A second constraint is related to the meaning of the bits in each column of the input data store. As will be discussed below it is envisaged that the 80 bits may consist of several groups each of which represents a particular parameter of the input speech. For example two or three bits may represent a voiced/unvoiced measure either in a binary representation or in a barchart representation:

| barchart | binary | |
|---|---|---|
| 000 | 00 | indeterminate (signal level too low) |
| 001 | 01 | unvoiced |
| 011 | 10 | intermediate voicing |
| 111 | 11 | voiced |

In the barchart representation, the significance of each bit is independent of the others (i.e., middle bit = 1 means that at least some voicing is present) and represents no constraint on the microfeature selection. In the case of the binary representation this is not so and the pair of bits is treated as indissoluble; i.e. the two bits always form part of the *same* microfeature. This will require some rule to prevent the microfeature having more than 8 bits (this rule will destroy the strict randomness of the choice of bits, but not so as to imperil the technique).

It is to be noted that the time-window feature facilitates the termination of the recognition process if a word ends before the one second period has expired. If random or other arrangements are used, then preferably any microfeatures consisting entirely of bits derived from periods of silence are ignored in the recognition process.

A further proposal is the introduction of time warping, to accommodate variations in the speed at which a given word is spoken. If a word is spoken slowly compared with the words on which the template has been trained, then though microfeatures at the start of the word may coincide temporally, those in the middle or at the end of the word will occur late.

This eventuality may be accommodated by applying the time warping technique now to be described. It should be noted that this assumes accurate temporal alignment of the beginning of the word. Since the time alignment process as described above tends to optimise the average alignment over the whole word, that process, if used, is preferably modified by restricting the comparison to the first (e.g.) 200 ms of the word. As with time alignment, the time-warping technique applied to template training will reduce the template's tolerance to variations in the speed of utterance unless the technique is also applied in the recognition mode.

Assuming firstly that the basic microfeature values have been assigned on the basis that each spans a maximum of 50 ms, extra microfeatures are generated as follows:

The earliest 200 microfeatures generate only one value. The next 200 will generate two values, with the bits coming from two windows displaced in time by 20 ms but having identical assignments within those windows. (If the assignment operator is visualised as an eight-pronged fork, highly distorted, stabbed into the data array, to pick out the bits forming a microfeature, then the time-warped microfeature value is generated by stabbing the same fork on to the data array 20 ms later).

The next 200 will generate three values, from three windows each displaced in time by 20 ms, and so on up to the last 200, which will exist in five forms. The total number of microfeatures will be $200\times(1+2+3+4+5)$, i.e., 3000, under this scheme. The spread in time of the last 200 will be 100 ms, representing a ±5% time warping. The actual degree of time warping applied would need to be chosen on the basis of experiment; the figures quoted being merely by way of example.

During training then microfeature 201 (for instance) will have two values for each utterance; assuming five training utterances there will be ten values. If there is no duplication of a value across the different utterances, then one value is chosen arbritrarily from each utterance and given a frequency of 1. Each value is given a frequency (i.e. the number of different utterances which produced that value) and the five values with the highest frequency are stored in the template. Similarly, for the later microfeatures with multiple values: each value is given a frequency equal to the number of different utterances producing the same value, and the five values with the highest frequencies are stored in the template for the chosen word.

In recognition mode, the information stored in the input array store is processed to produce 3000 microfeature values. The values of these are used to form a data array, referred to here as the "tableau", which has dimensions of 1000 by 256 and forms part of the search control 19 of FIG. 3. The index (from 1 to 1000) of each microfeature addresses a row of this tableau, and a 1 is written into the column corresponding to the value (from 1 to 256) of the microfeature. Thus the first 200 rows will have one 1, rows 201 to 400 one or two 1's, and so on with up to five 1's in the last 200 rows.

The tableau is now addressed by the stored microfeature values forming the template for each word. Specifically, each microfeature value from a template addresses the row in the tableau having the same index, and the column with its value, and if a 1 is present, then the frequency of the microfeature value is treated as its weight, read out, and accumulated to arrive at a total score. As before, this is then normalised by dividing by the maximum score the unknown word could achieve, to arrive at the relative probability that the unknown word matches the template word.

For microfeatures 201 onwards, there are two or more entries (1's) in each row of the tableau. Preferably the microfeature values in the template store are ordered with the highest frequencies at the top, so that the first frequency to be read out will be the highest possible score for that microfeature. As soon as a match has been found the next microfeature is addressed. Similarly, in determining the maximum score for any template, only the frequency at the top of the list corresponding to each index needs to be read out and accumulated.

This is repeated for all the stored templates, and the identity of the template achieving the highest relative probability is output as the word deemed to be the best match to the unknown word.

This warping process represents a quasi-linear distortion of the time axis and is easy to do by simple shifting because of the restricted time window within which the bits of any given microfeature lie. If entirely random assignment of the bits is used then the individual bits of the microfeature would need to be shifted by amounts depending on their temporal position within the input data array (analogous to an elastic fork). Those microfeatures which happened to contain bits in the last 200 ms would exist in 5 forms, with the individual bits suitably warped in a quasi-linear manner. Those which contained bits no later in time than the interval 600 to 800 ms from the start of the input data array would exist in 4 forms, and so on, so that a microfeature all of whose component bits fell within the initial 200 ms interval would exist in only one form.

Statistically, the total number of microfeature values will be just the same under this scheme, i.e., 3000. The operation of this technique will be very similar to the technique described above.

The nature of the front end processing 12 will now be discussed further. There are a number of possible parameters which may be derived for entry into the input data store. Not all of these would necessarily be used in any particular apparatus, though since it is envisaged that the parameters will be fairly coarsely quantised it is thought desirable to include both frequency domain parameters and time domain parameters, on the basis that the information lost in quantisation is different in the two cases. Possible features are as follows:

i) total energy within the speech frequency band ii) voiced/unvoiced measure iii) spectral energy levels—i.e., the energy levels within a number of respective frequency bands spanning the range.

iv) spectral energy gradients—i.e., the difference between the levels in adjacent ones of the bands referred to in (iii).

v) spectral energy time profiles—i.e., the differences between the energy levels within a number of respective frequency bands in successive sample periods vi) zero-crossing rate—the number of zero-crossings of the speech wave form during a given period vii) wiggle rate—the number of stationary points (maximum and minimum) in the speech wave form during a given period viii) excess stationary points—the difference between (vii) and (vi).

Considering possible implementation for each of these in turn, assuming a sampling rate of for example one per 10 ms:

i) Energy

A filter spanning the whole of the useful speech frequency range, say 200 Hz to 5000 Hz (6 db points, gentle roll-offs), is used to produce an energy profile of the word. The absolute output level of the filter is represented by four bits, i.e., 16 levels which are then coarsely quantised, with non-linear intervals; i.e. each of the 16 levels will be assigned to one of (say) four of five new measures. For a continuous quantity such as energy, bar-chart coding is used, and three possibilities are:

| 00 | 000 | 0000 | "silence"- | i.e. energy below some threshold |
|----|-----|------|------------|----------------------------------|
|    | 001 | 0001 | low        |                                  |
| 01 |     | 0011 | moderate   |                                  |
|    | 011 | 0111 | considerable |                                |
| 11 | 111 | 1111 | loud       |                                  |

Normalisation could be introduced, in principle, by recording the actual dynamic range of the input energy levels over some suitable period of time, and adjusting the assignment to the parameter codes accordingly. However, agc in speech needs to be treated with caution, and should only act rather slowly.

ii) Voiced—Unvoiced Measure

The ratio of low-frequency energy to high-frequency energy is used as a measure of voicing. A two-bit code should be adequate, i.e.:

00 indeterminate, i.e., levels too low for ratio to be significant 01 unvoiced—ratio less than some threshold 10 intermediate voicing 11 voiced Suitable frequency ranges for the two filters are: low-band, 300 Hz to 1600 Hz, 3 db points; high-band, 2300 Hz to 5000 Hz, 3 db points, both with gentle roll-offs. The energy levels in the filters would be represented by four-bit linear codes. The assignment of their ratios to the parameter codes would probably be non-linear, and would in any case depend on one or other being above some appropriate threshold level (different for each filter band).

iii) Spectral Energy Levels

Spectral analysis is carried out by a bank of 16 filters, spanning the range 200 Hz to 5000 Hz, with centre frequencies logarithmically spaced from 250 Hz to 4500 Hz, and with 4.5 db loss at the overlap points. The outputs from the filters are sampled every 10 ms, coded linearly by four bits, and are then heavily quantised for assignment to parameter codes. Three or four non-linear levels are probably sufficient, represented by bar-chart coding (two or three bits), i.e.

| 00 | 000 | below some threshold |
|----|-----|----------------------|
| 01 | 001 | low                  |
|    | 011 | intermediate         |
| 11 | 111 | high                 |

Again, normalisation could be introduced, as discussed under (i) with the same caveat.

iv) Spectral Energy Gradients

The linearly coded outputs from the bank of filters is examined a second time to provide another set of parameter codes. These are, in each 10 ms period, the energy differences progressing from low frequencies to high. There are 15 of these, and they are then quantised very coarsely, as follows:

00 indeterminate—both levels less than some threshold
  01 "−": difference negative
  10 "+": difference positive
  11 "=": difference less than some threshold If the voiced-unvoiced measure indicates partial or full voicing, then a sequence (progressing from low frequencies to high) [+, −], or [+, =, −] indicates a maximum, and may be identified with a formant. It is know that formant ratios are important "quasi-invariants" of speech. Thus the use of logarithmically spaced filters allows these ratios to be displayed by simple realigning the codes, in such a way as to bring all the lowest formants to the same level.

Imagine that the codes above are written on vertical strips of paper, one for each successive 10 ms interval. If the lowest entry, corresponding to the difference between the energy levels from the two lowest filters, is +, then the first formant will be assumed to be above the lowest filter. Slide the strip down until the new entry at the original level is either = or −. Then the first formant will now be aligned with (or slightly below) the original level, which is adopted as a datum line. If the lowest entry is =, then it will be assumed that the first formant lies between the two lowest filter bands, and the strip is left unchanged. If the lowest entry is −, then it will be assumed that the first formant lies below the lowest filter band, but hopefully not too far below, and the strip will again be left unchanged.

In this way, the first formants will all be (roughly) aligned with the datum line. Since the filters are logarithmically spaced, the position of the next maximum, indicated by the sequences [+, −] or [+, =, −], will indicate the ratio of the second to the first formant, and the position of the next maximum will indicate the ratio of the third to the first.

The realigning of the spectral energy differences is only carried out when partial or full voicing is detected. Otherwise the entries are left unchanged.

The realignment is intended to facilitate speech recognition. For speaker verification purposes, no realignment is carried out. Thus in a transaction where verification is important at certain stages, and recognition at others, a simple change of algorithm could be made under software control.

v) Spectral Energy Time Profiles

Just as the energy gradients against frequency can be categorised, within one 10 ms time interval, so the energy gradients in each filter band can be categorised against time. Here there are 16 energy differences, which can be represented by the same coding scheme as in (iv) above. If partial or full voicing is being used to realign the spectral energy gradients, as described in the previous section, then the profiles against time can be subjected to the same transformation, which must be controlled by the spectral energy gradient information.

vi) Zero-crossing Rate

The number of zero crossings occurring in a fixed time interval, say 2.5 ms, is counted, and coded appropriately e.g. as follows:

| 0000 | no zero crossings    |
|------|----------------------|
| 0001 | 1 or 2 crossings     |
| 0011 | 3, 4 or 5 crossings  |
| 0111 | 6 to 11 crossings    |
| 1111 | 12 to 20 crossings   |

The maximum number of zero crossings would be $8 \times$ (period in ms), and the period could be increased or decreased if need be. Some form of smoothing or filtering would be desirable before coding, e.g. averaging three adjacent values, or applying an f.i.r. (finite impulse response) filter with coefficients $\frac{1}{4}, \frac{1}{2}, \frac{1}{4}$ for example.

vii) Wiggle Rate

The number of stationary points (maxima and minima) in a fixed period would be counted and coded. The period would be the same as for assessing the zero crossing rate, and a similar coding scheme would be used, perhaps after smoothing, i.e.

| 000 | 0 to 2   | extrema; or, | 00 | 0 to 3   | extrema |
|-----|----------|--------------|----|----------|---------|
| 001 | 3 to 6   | "            | 01 | 4 to 10  | "       |
| 011 | 7 to 12  | "            |    |          |         |
| 111 | 13 to 20 | "            | 11 | 11 to 20 | "       | viii) Excess Stationary Points

In seeking a more compact parameter from the waveform, which is hopefully meaningful, it may be worth considering the excess number of stationary points over zero crossings. The parameter would vary from 0 to 20. It could be represented after smoothing as follows:

| 000 | 0 to 2   | excess | extrema |
|-----|----------|--------|---------|
| 001 | 3 to 6   | "      | "       |
| 011 | 7 to 12  | "      | "       |
| 111 | 13 to 20 | "      | "       |

A possible selection from the above, to make up the 80 bit allocation suggested earlier might be:

| a) Total speech energy                           | 4 bits  |
|--------------------------------------------------|---------|
| b) Number of stationary points: 4 × 3 bits, i.e. | 12 bits |
| c) Spectral energy levels: 16 × 2 bits, i.e.     | 32 bits |
| d) Spectral energy gradients: 15 × 2 bits, i.e.  | 30 bits |
| e) Voiced - unvoiced measure                     | 2 bits  |
| Total                                            | 80 bits |

There is a paradox involved in the method of scoring outlined earlier. Suppose that five utterances are used in forming the template, and that four of them are identical, while the fifth has no microfeatures in common with these four. Then a repetition of the repeated utterance will score 100%, while a repetition of the singleton utterance will score 25%, the maximum it could achieve, although it may have equal validity with the repeated utterance.

One way of monitoring this situation is to count the number of zeros added into the score. When this number becomes rather low, it is an indication of a large number of matches between stored values of microfeatures and values from the unknown utterance, but may nevertheless be associated with a low score. Some kind of weighting could be applied to the actual score in this situation. Alternatively, rather than use the frequency of occurrence as the weight to be accumulated, a monotonic function of the frequency could be used, via a look-up table. An approximation to the square-root of the frequency is suggested as a suitable function.

Another possible variation is the provision of accelerated processing. In one such option—where microfeatures are derived from restricted time windows—those derived from an early portion of the unknown utterance can be processed to determine, e.g., those 25% of the templates most likely to score highly. By the time this operation has been completed, further microfeature values will have been generated and these can be used for a final sort of the selected 25% (or a three-stage process could be adopted, depending on the processing speed and number of templates).

Alternatively a random selection of microfeatures may be used in a first sort, followed by one or more further sortings. As a back-up to either of these options the normal processing could be carried out too, to apply a correction to any action taken as a result of the accelerated result, if this proved to be incorrect.

I claim:

1. A pattern recognition device comprising:
   (a) input means for producing a pattern of bits;
   (b) means storing assignment data defining predetermined groups of said bits;
   (c) a template store; and
   (d) control means operating
      (i) in a training mode to record in the template store, for each of the defined groups the frequency with which combinations of bits within that group occur in a plurality of the said patterns and operating
      (ii) in a recognition mode in response to an unknown pattern provided by said input means, to retrieve for each defined group of bits selected from said unknown pattern, in response to the bits of the group, the frequency if any which is recorded in the template store for that particular combination of bits, to form a similarity measure for that unknown pattern as a function of the retrieved frequencies, and to produce an output indicative of successful or unsuccessful recognition in dependence on whether the similarity measure meets a recognition criterion, and
      (iii) in the recognition mode, to adjust the stored frequency in the template store for any group in respect of which a frequency is already stored, for a particular bit combination occurring in the unknown pattern which meets the recognition criterion.

2. A pattern recognition device comprising:
   (a) input means for producing a pattern of bits;
   (b) means storing assignment data defining groups of bits selected from said pattern;
   (c) a template store; and
   (d) control means operating
      (i) in a training mode to record in the template store, for each of the defined groups the frequency with which combinations of bits within that group occur in a plurality of the said pattern and operating
      (ii) in a recognition mode in response to an unknown pattern provided by said input means, to retrieve for each defined group of bits selected from said unknown pattern, in response to the bits of the group, the frequency if any which is recorded in the template store for that particular combination of bits, to form a similarity measure for that unknown pattern as a function of the retrieved frequencies, and to produce an output indicative of successful or unsuccessful recognition in dependence on whether the similarity measure meets a recognition criterion, and
   each template store has for each group a respective section comprising a plurality of entries each comprising a location for storage of a particular bit combination and a location for storage of the frequency associated with that combination.

3. A pattern recognition device comprising:
   (a) input means for receiving a pattern of bits;
   (b) means storing assignment data defining groups of bits selected from the pattern;
   (c) a template store, and
   (d) control means operating
      (i) in a training mode to record in the template store, for each of the defined groups data indicating which combinations of bits within that group occur in the said patterns, and operating,
      (ii) in a recognition mode in response to an unknown pattern provided by said input means, to retrieve for each defined group of bits selected from the pattern, in response to the bits of the group, an indication as to whether that particular combination of bits is recorded in the template store as having occurred to form a similarity measure for that pattern as a function of the retrieved indicators, and to produce an output indicative of successful or unsuccessful recognition in dependence on whether the similarity measure meets a recognition criterion;
   the template store having for each group a respective section comprising a plurality of entries each comprising a location for storage of a particular bit combination.

4. A device according to claim 1, 2 or 3, in which the input means receives speech signals and produces a pattern of bits representing, for an interval of speech, characteristics of the speech signals in successive time periods of that interval.

5. A device according to claim 4 in which the device disregards groups derived exclusively from parts of the pattern representing silence.

6. A device according to claim 4 in which the assignment data represent groups of bits selected randomly from the pattern.

7. A device according to claim 6 in which the control means is operable, at least in the recognition mode, to select, in addition to the said bit groups, additional bit groups each related to one of the said bit groups and consisting of bits temporally shifted relative to the bit assignments of the related group by an amount related to the temporal position of that bit within the pattern.

8. A device according to claim 4 in which the assignment data represent groups of bits each of which groups comprises bits selected from within a limited time window of the pattern.

9. A device according to claim 8 in which the majority of the groups are each selected from different time windows, of equal duration.

10. A device according to claim 8 in which the said groups are notionally divided into a first category and successively later categories each consisting of groups derived from later time windows than are the groups of the preceding category, and the control means is operable, at least in the recognition mode, to select, for each group other than those in the first category, one or more additional groups each consisting of bits temporally shifted, by an amount which is the same for all bits of that group, relative to the bit assignments of the group to which it is related, the number of additional groups selected and the range of temporal shifts to which they are subject successively increasing for successive categories.

11. A device according to claim 10 in which the control means is operable to perform the additional bit group selection process also in the training mode after at least one pattern has been processed in the training mode.

12. A device according to claim 4 in which the control means is operable, at least in the recognition mode, to perform a temporal alignment process comprising forming the similarity measure for the pattern with a plurality of temporal alignments and processing that pattern with whichever temporal alignment produces the similarlity measure indicating the greatest similarity.

13. A device according to claim 12 in which the control means is operable to perform the temporal alignment process also in the training mode after at least one pattern has been processed in the training mode.

14. A device according to claim 12 in which the temporal alignment process is restricted to an early portion of the pattern.

15. A device according to claim 4 in which the input means produces for each of the said time periods a plurality of bits some of which represent a characteristic of the waveform of the speech signal and others of which represent a characteristic of the frequency spectrum of the signal.

16. A device according to claim 4 in which the input means produces for each of the said time periods a plurality of bits comprising bits representing two or more of the following characteristics:
i) total energy within the speech frequency band
ii) voiced/unvoiced measure
iii) the energy levels within a number of respective frequency bands
iv) the difference between the levels in adjacent ones of the bands referred to in (iii).
v) the differences between the energy levels within a number of respective frequency bands in successive sample periods
vi) the number of zero-crossings of the speech waveform during a given period
vii) the number of stationary points in the speech waveform during a given period.

17. A device according to claim 16 in which the input means produces for each of said time periods sets of bits representing values corresponding to the differences between the energy levels in adjacent ones of the bands referred to in (iii), the said bands having logarithmically spaced center frequencies, and in which, for each time period, each set of values, considered in an order corresponding to ascending frequency, is, before said input means produces the said pattern of bits, shifted if necessary such that the lowest-order value of said values which represents higher frequency band energy level equal to or lower than the lower frequency band energy level is aligned with a datum.

18. A device according to claim 4 in which at least one characteristic of the speech signal is represented in the pattern by two or more bits having independent meanings, and the selection of the bits forming a group or additional group is such that those two or more bits are selected for the same group.

19. A device according to claim 1 or 2 in which the similarity measure includes forming the sum of the retrieved frequencies.

20. A device according to claim 1 or 2 in which the similarity measure includes forming the sum of the square roots of the retrieved frequencies.

21. A device according to claim 1, 2 or 3 in which each group has the same number (n) of bits.

22. A device according to claim 3, for speech recognition, in which the input means produces from received speech signals a pattern of bits representing, for an interval of speech characteristics of the speech, signals in successive time periods of that interval.

23. A device according to claim 3 in which the device is arranged to disregard groups derived exclusively from parts of the pattern representing silence.

24. A device according to claim 3 in which the assignment data represent groups of bits selected randomly from the pattern.

25. A device according to claim 24 in which the control means is operable, at least in the recognition mode, to select, in addition to the said bit groups, additional bit groups each related to one of the said bit groups and consisting of bits temporally shifted relative to the bit assignments of the related group by an amount related to the temporal position of that bit within the pattern.

26. A device according to claim 3 in which the assignment data represent groups of bits each of which groups comprises bits selected from within a limited time window of the pattern.

27. A device according to claim 26 in which the majority of the groups are each selected from different time windows, of equal duration.

28. A device according to claim 26 in which the said groups are notionally divided into a first category and successively later categories each consisting of groups derived from later time windows than are the groups of the preceding category, and the control means is operable, at least in the recognition mode, to select, in respect of each group other than those in the first category one or more additional groups each consisting of bits temporally shifted, by an amount which is the same for all bits of that group, relative to the bit assignments of the group to which it is related, the number of additional groups selected and the range of temporal shifts to which they are subject successively increasing for successive categories.

29. A device according to claim 28 in which the control means is operable to perform the additional bit group selection process also in the training mode after at least one pattern has been processed in the training mode.

30. A device according to claim 3 in which the control means is operable, at least in the recognition mode, to perform a temporal alignment process comprising forming the similarity measure in respect of the pattern with a plurality of temporal alignments and processing that pattern with whichever temporal alignment produces the similarity measure indicating the greatest similarity.

31. A device according to claim 30 in which the control means is operable to perform the temporal alignment process also in the training mode after at least one pattern has been processed in the training mode.

32. A device according to claim 30 in which the temporal alignment process is restricted to an early portion of the pattern.

33. A device according to claim 3 in which the input means is arranged to produce for each of the said time periods a plurality of bits some of which represent a characteristic of the waveform of the speech signal and others of which represent a characteristic of the frequency spectrum of the signal.

34. A device according to claim 3 in which the input means is arranged to produce for each of the said time periods a plurality of bits comprising bits representing two or more of the following characteristics:
 i) total energy within the speech frequency band
 ii) voiced/unvoiced measure
 iii) the energy levels within a number of respective frequency bands
 iv) the difference between the levels in adjacent ones of the bands referred to in (iii)
 v) the differences between the energy levels within a number of respective frequency bands in successive sample periods
 vi) the number of zero-crossings of the speech waveform during a given period
 vii) the number of stationary points in the speech waveform during a given period 35. A device according to claim 34 in which the input means is arranged to produce for each of the said time periods bits representing values corresponding to the differences between the energy levels in adjacent ones of the bands referred to in (iii), the said bands having logarithmically spaced centre frequencies, and in which, for each time period, each set of values, considered in an order corresponding to ascending frequency, is, before entry into the said pattern of bits, shifted if necessary such that the lowest-order value which represents higher frequency band energy level equal to or lower than the lower frequency band energy level is aligned with a datum.

36. A device according to claim 3 in which at least one characteristic of the speech signal is represented in the pattern by two or more bits the meanings of which are interdependent, and the selection of the bits forming a group of additional group is such that those two or more bits are selected for the same group.

37. A device according to claim 3 in which each group has the same number (n) of bits.

38. A device according to claim 1 in which, in the recognition mode, the control means is operable, for any group in which a frequency for the particular bit combination occurring in the unknown pattern is not already stored in the template store, and if the recognition criterion is met, to write a frequency into that template store in respect of that group having that combination.

39. A device according to claim 1 or 38 in which the control means performs the frequency adjustment and frequency recording, if any, conditionally upon the presence or absence of an external signal supplied to the control means respectively confirming or not confirming successful recognition.

40. In a pattern recognition device of the type which detects and compares occurrences of specific n-tuple features between unknown input and known template patterns to identify the known template pattern most likely corresponding to the unknown input pattern, the improvement comprising:
 means for storing first data representing a multi-bit value and its occurrence frequency for each of plural predetermined n-tuple features in said known template patterns;
 means for deriving and temporarily storing second data for detected multi-bit values of said n-tuple feature occurrences in said unknown input pattern, said second data corresponding to any of said known template patterns also representing the same multi-bit values of said n-tuple feature occurrences and being weighted by said first data representing the stored frequency of such n-tuple feature occurrences therein; and
 means for comparing said second data corresponding to different known template patterns to identify the known template pattern most likely corresponding to the unknown input pattern.

41. An improved pattern recognition device as in claim 40 further including means for adjusting said first data to increase the apparent occurrence frequency of n-tuple features occurrences for known template patterns which are successfully identified as corresponding to unknown input patterns so as to thereafter increase the relative weight associated with that particular n-tuple feature.

42. An improved pattern recognition device as in claim 40 or 43 further including means for continuously adjusting said first data as a function of past successful pattern recognition events so as to increase or decrease the frequency-weighting corresponding to particular n-tuple features of particular known template patterns, or to add or subtract n-tuple features and associated occurrence frequency data corresponding to particular known template patterns.

43. A pattern recognition method of the type which detects and compares occurrences of specific n-tuple features between unknown input and known template patterns to identify the known template pattern most likely corresponding to the unknown input pattern, the method comprising:
 detecting and storing first data representing a multi-bit value and its occurrence frequency for each of plural predetermined n-tuple features in said known template patterns;
 deriving and temporarily storing second data for detected multi-bit values of said n-tuple feature occurrences in said unknown input pattern, said second data corresponding to any of said known first template patterns also representing the same multi-bit values of said n-tuple feature occurrences and being weighted by said first data representing the stored frequency of such n-tuple feature occurrences therein; and comparing said second data corresponding to different known template patterns to identify the known template pattern most likely corresponding to the unknown input pattern.

44. A pattern recognition method as in claim 43 further including the step of adjusting said first data to increase the apparent frequency of n-tuple feature occurrences for known template patterns which are successfully identified as corresponding to unknown input patterns so as to thereafter increase the relative weight associated with that particular n-tuple feature.

45. A pattern recognition method as in claim 43 or 44 further including the step of continuously adjusting said first data as a function of past successful pattern recognition events so as to increase or decrease the frequency-weighting corresponding to particular n-tuple features of particular known template patterns and to add or subtract n-tuple features and associated occurrence frequency data corresponding to particular known template patterns.

46. A pattern recognition method as in claim 43 or 44 further including the step of continuously adjusting said first data as a function of past successful pattern recognition events so as to increase or decrease the frequency-weighting corresponding to particular n-tuple features of particular known template patterns or to add or subtract n-tuple features and associated occurrence frequency data corresponding to particular known template patterns.

* * * * *